March 7, 1967 N. J. ROSEN 3,308,252

DATA INPUT STATION FOR PUNCHED CARDS

Filed March 28, 1963 14 Sheets-Sheet 1

INVENTOR.
NORMAN J. ROSEN

BY Christie, Parker & Hale
ATTORNEYS.

INVENTOR.
NORMAN J. ROSEN
BY
Christie, Parker & Hale
ATTORNEYS.

March 7, 1967 N. J. ROSEN 3,308,252

DATA INPUT STATION FOR PUNCHED CARDS

Filed March 28, 1963 14 Sheets-Sheet 3

DATA INPUT STATION FOR PUNCHED CARDS

Filed March 28, 1963 14 Sheets-Sheet 4

March 7, 1967 N. J. ROSEN 3,308,252

DATA INPUT STATION FOR PUNCHED CARDS

Filed March 28, 1963 14 Sheets-Sheet 5

March 7, 1967 N. J. ROSEN 3,308,252

DATA INPUT STATION FOR PUNCHED CARDS

Filed March 28, 1963 14 Sheets-Sheet 6

INVENTOR.
NORMAN J. ROSEN

BY Christie, Parker & Hale
ATTORNEYS.

INVENTOR.
NORMAN J. ROSEN
BY
Christie, Parker & Hale
ATTORNEYS.

March 7, 1967 N. J. ROSEN 3,308,252

DATA INPUT STATION FOR PUNCHED CARDS

Filed March 28, 1963 14 Sheets-Sheet 8

INVENTOR.
NORMAN J. ROSEN

BY

Christie, Parker & Hale
ATTORNEYS.

March 7, 1967 N. J. ROSEN 3,308,252

DATA INPUT STATION FOR PUNCHED CARDS

Filed March 28, 1963 14 Sheets-Sheet 9

March 7, 1967 N. J. ROSEN 3,308,252
DATA INPUT STATION FOR PUNCHED CARDS
Filed March 28, 1963 14 Sheets-Sheet 10

INVENTOR.
NORMAN J. ROSEN
BY
Christie, Parker & Hale
ATTORNEYS.

DATA INPUT STATION FOR PUNCHED CARDS

INVENTOR.
NORMAN J. ROSEN

BY

Christie, Parker & Hale
ATTORNEYS.

March 7, 1967 N. J. ROSEN 3,308,252

DATA INPUT STATION FOR PUNCHED CARDS

Filed March 28, 1963 14 Sheets-Sheet 13

INVENTOR.
NORMAN J. ROSEN

BY Christie, Parker & Hale
ATTORNEYS.

March 7, 1967 N. J. ROSEN 3,308,252

DATA INPUT STATION FOR PUNCHED CARDS

Filed March 28, 1963 14 Sheets-Sheet 14

3,308,252

DATA INPUT STATION FOR PUNCHED CARDS

Norman J. Rosen, Altadena, Calif., assignor, by mesne assignments, to Giannini Controls Corporation, Duarte, Calif., a corporation of New York
Filed Mar. 28, 1963, Ser. No. 268,650
5 Claims. (Cl. 200—46)

This invention relates to data acquisition systems and more particularly to an input station for collecting data including by means of record members or cards having information recorded thereon in terms of perforations and deriving electrical indications thereof for transmission to a data recorder and/or a data processor.

Data processing systems utilizing information derived from perforated record members or cards have been devised for many applications. In general, the perforated record cards have been read or processed in large volumes at high speeds. The advantages of the punched record data processing system have made it desirable to use the perforated record member for monitoring production lines in industrial processing systems and the like. The monitoring of manufacture in this fashion would be provided by an operator transmitting information representative of the status or the condition of the manufacture at preselected stations and at preselected intervals whereby the information transmitted by any one operator or operators is all received by a central data processor. The data processor, in turn, operates on the information to give the desired over-all indication of the manufacture and allow any changes that may be needed to be transmitted to the operator. This type of monitoring operation has led to a demand for an inexpensive data entry device or input station including a punched record reader, preferably portable, that may be utilized in a plurality of remote locations for such monitoring purposes.

This invention provides an improved, compact, more reliable and inherently less expensive input station than was heretofore possible. The record reader portion of the input station is constructed in accordance with the teachings of co-pending applications Serial No. 197,533, filed on May 24, 1962, entitled, Record Reader now United States Patent No. 3,156,793 and Serial No. 198,685, filed on May 24, 1962, entitled, record reader, and both assigned to the same assignee as the present application.

The record reader portion of the input station may advantageously be defined to receive a data record card along with an employee badge record member to allow the data to be identified with a particular data record for each station in the fashion of an employee's "signature." In addition to the record reader, the input station includes variable data selector entry switches allowing manual insertion of data along with the data derived by the record reader for transmission to the reading station. The information thus entered at the input station, both the card reader and variable data switch information, is transmitted in a preselected sequence by means of a conventional dial telephone spring motor which affords an excellent torque speed characteristic essentially independent of load to transmit the information entered into the input station with a high degree of reliability.

In the disclosed embodiment of the invention the input station is arranged for reading the record members or cards arranged on a card receiving tray which is normally extended from the housing of the input station proper. The record reading portion of the input station is provided with a plurality of electrical conductive sensing elements slidable with the record member upon sensing a perforation in the record member to a position forming a cross-connection between a row and column conductor whereby the row and column conductor identify the physical location of the sensed perforation on the record member. In this fashion the columns of the record member may be sensed in a parallel relationship and electrical indications of the perforation locations are provided in a parallel circuit fashion. The variable data selector switches are mounted on the input station proper to allow manual insertion of data by the operator and which may be entered in a parallel columnar relationship as in the record reader whereby the two groups of information exist in a parallel circuit relationship simultaneously. The circuits defining the columnar relationship of both the record reader signals and the variable data signals are connected to a distributor circuit means which is adapted for coaction with a conventional dial telephone spring motor for sequentially energizing the individual pieces of information connected thereto. The spring motor is wound through means coupled thereto and the card receiving tray whereby the spring is wound in response to the insertion of the tray into the input station to the record reading position. The spring motor is normally maintained in an inoperative position by releasable means adapted to be actuated by a command signal from the recording station. Upon release of the spring motor the distributor arm functions to sequentially contact the distributor terminals and thereby provide an electrical circuit through either one of the variable data selector switches or the sensing fingers of the record reader to the recording station. The arrangement of all the data at the input station in the parallel circuit relationship advantageously allows various error detection techniques to be employed to assure that only correct data is transmitted to the recording station.

These and other features of the present invention may be more fully appreciated when considered in the light of the following specification and drawings, in which:

FIG. 7 is a bottom plan view of the circuit structure taken along the line 7—7 of FIG. 3;

The input station 10 of the present invention is particularly adapted for use in a data collection or data acquisition system. In general, the input stations 10 are spaced at a plurality of preselected locations for collecting information in accordance with the particular application of the data acquisition system. As is well known, the data acquisition system may be used for production control, accounting, and similar types of applications. The data acquisition is generally accomplished by means of pre-punched record members for use with the input station. The record members are placed in the input stations 10 and the information recorded in terms of the perforations is sensed and converted to electrical signals corresponding thereto and transmitted to a data recording station for later processing by a data processing system.

Figure 2:
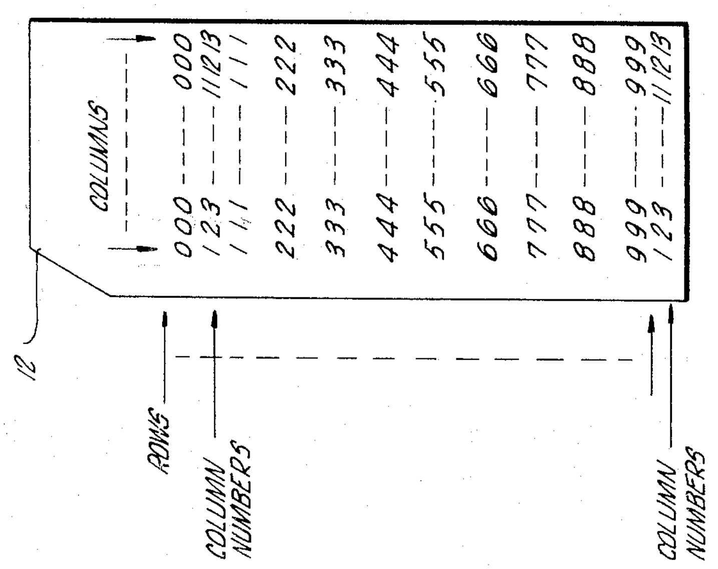
FIG. 2 is a representation of a typical record member for use with the input station of FIG. 1.
Figure 1A:
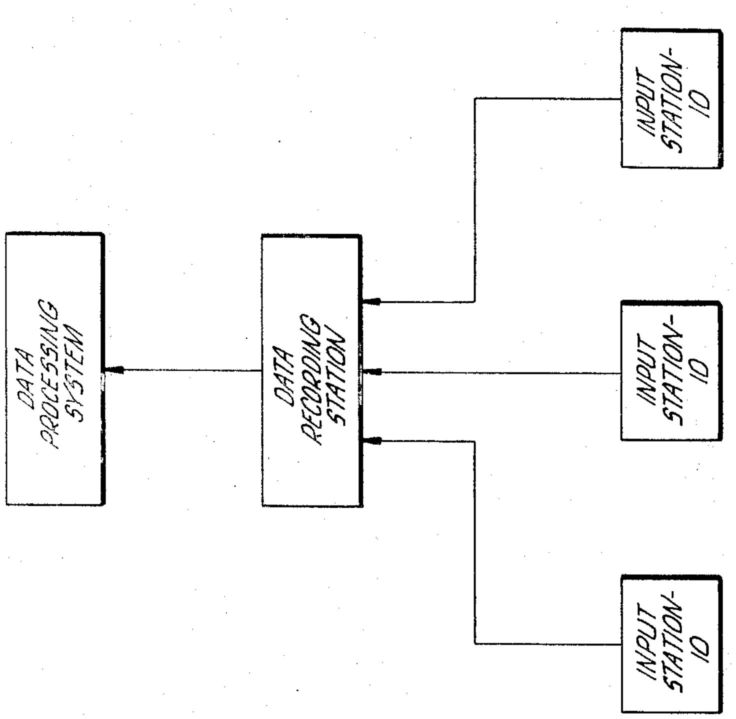
FIG. 1A is a block diagram of a data acquisition system showing the relationship of the input station of FIG. 1 in relation to the other elements of the data acquisition system.

The input station 10 is particularly adapted to record a record member arranged with a preselected number of rows and columns and having coded information recorded thereon in terms of perforations in a particular row and column. A typical record member for the purposes of this invention is shown in FIG. 2 and will be recognized as similar to the standard "IBM" punch card. The record member 12 is arranged with columns extending lengthwise, and the rows are arranged transversely thereto to subdivide the width of the card into approximately twelve rows. This type of record member varies in length in accordance with the required number of columns to be read and may range up to eighty columns in length. The record member 12 is shown with thirteen columns and twelve rows and the input station 10 is adapted for reading record members of full column or capacity or partial capacity (record member 12) or a plurality of record members simultaneously.

Now referring to the drawings, the construction of the input stations for sensing and transmitting information to a recording station will be examined. The input station 10 for the data acquisition system includes both the record reader and the means for transmitting the information read from a record member to a remote receiving station. The record reader portion of the input station has been described and claimed in co-pending continuation-in-part applications Serial No. 197,533, filed on May 24, 1962, entitled, Record Reader, and Serial No. 198,685, filed on May 24, 1962, entitled, Record Reader, and assigned to the same assignee as the present application and which disclosures are incorporated herein by reference. The general organization of the record reader portion for the input station is the same as described in the aforementioned co-pending applications. To this end, a record member to be read is positioned on a movable tray and presented to a plurality of sensing elements for sensing each of the columns on the record member, the sensing elements being normally arranged in a non-read position and moved from this position to a perforation indicating position in response to the movement of the tray. The sensing elements are slidably moved in response to locating a perforation on a record card to a position between a row conductor bar and a column bus to provide a cross connection therebetween for providing an electrical signal indicative of the physical location of the perforation on the record member. A printed circuit board mounts the row bars and column buses and a separate distributor printed circuit board is connected with each column bus corresponding to the columns from which it is desired to read information whereby the perforation locating signals are formed through the conductive sensing elements and connected by means of the row bars to the recording station by cabling or the like.

The row conductor bars 32 are arranged in the same plane as the column buses 40 by means of a single printed circuit board. This printed circuit board is mounted to the supporting structure 83 and in turn is mounted on the base member 84. The supporting structure 83 further includes a magnetic detent assembly comprising a permanent magnet 80 for releasably retaining each of the sensing elements 82 in a non-read position. The sensing elements 82 are adapted for reading a record member presented thereto by means of the slidable tray 85.

Figure 6:
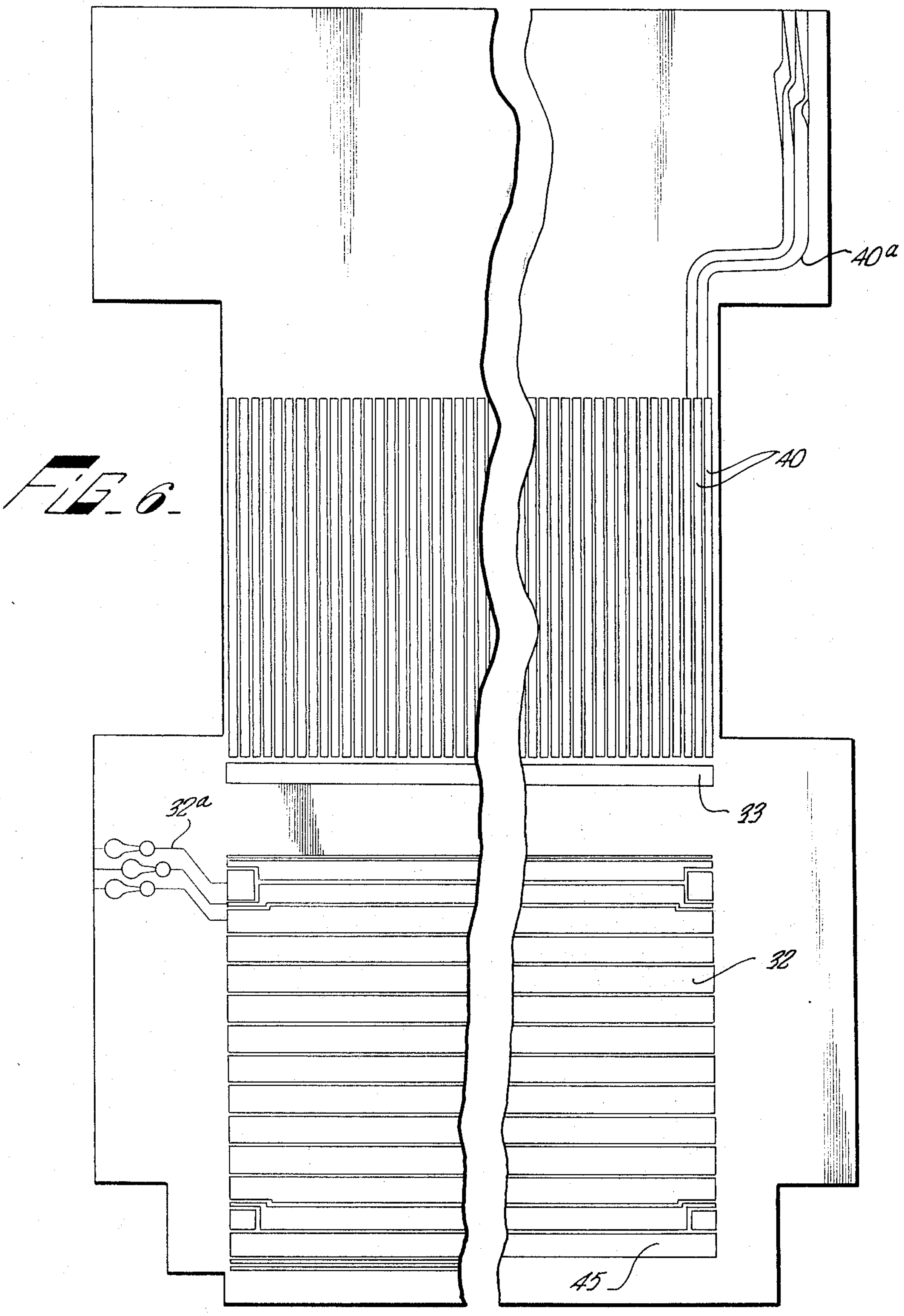
FIG. 6 is a plan view of a detached printed circuit board having the row and column buses defined thereon for use with the record reader of the input station.
Figure 1:
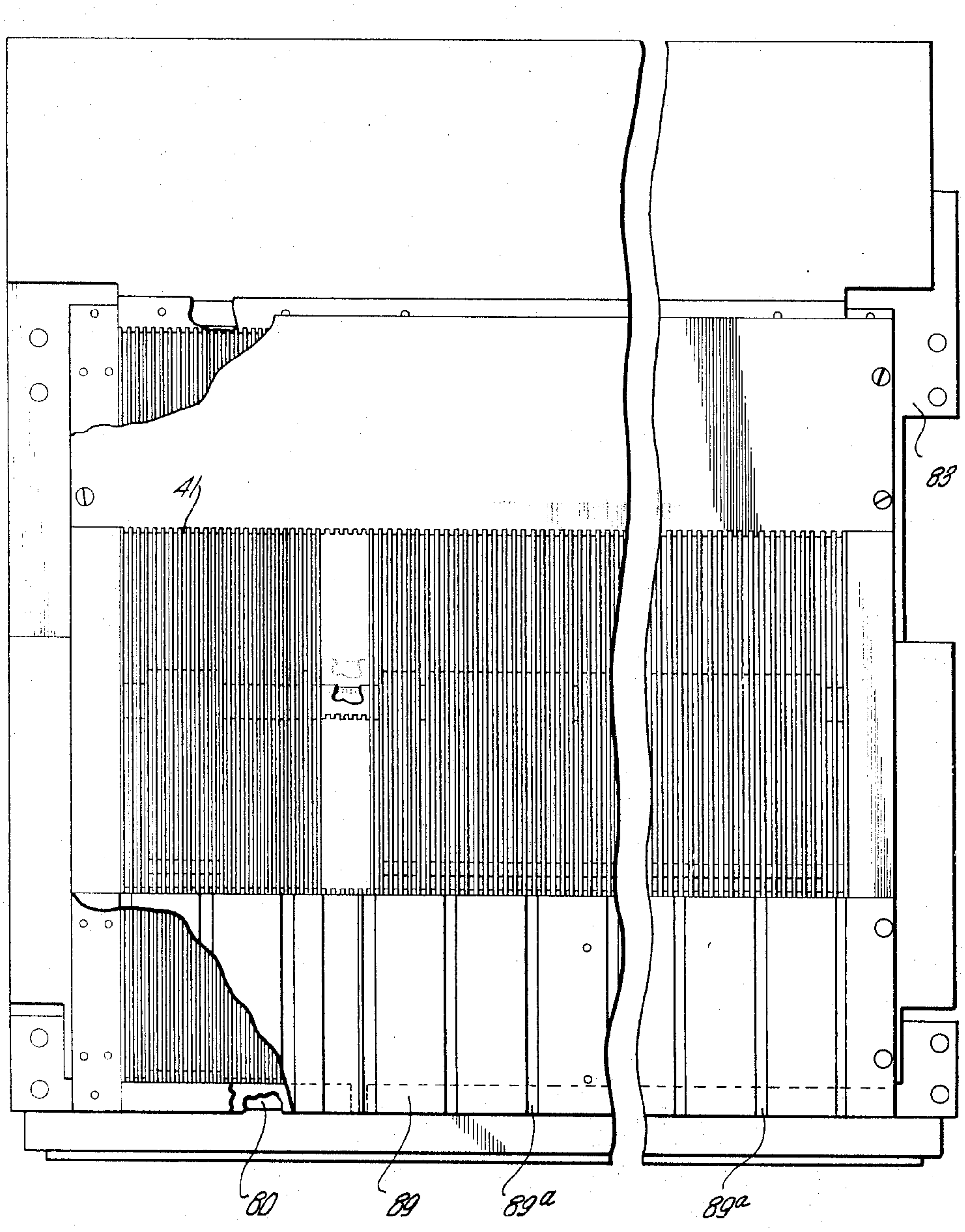
Figure 8:
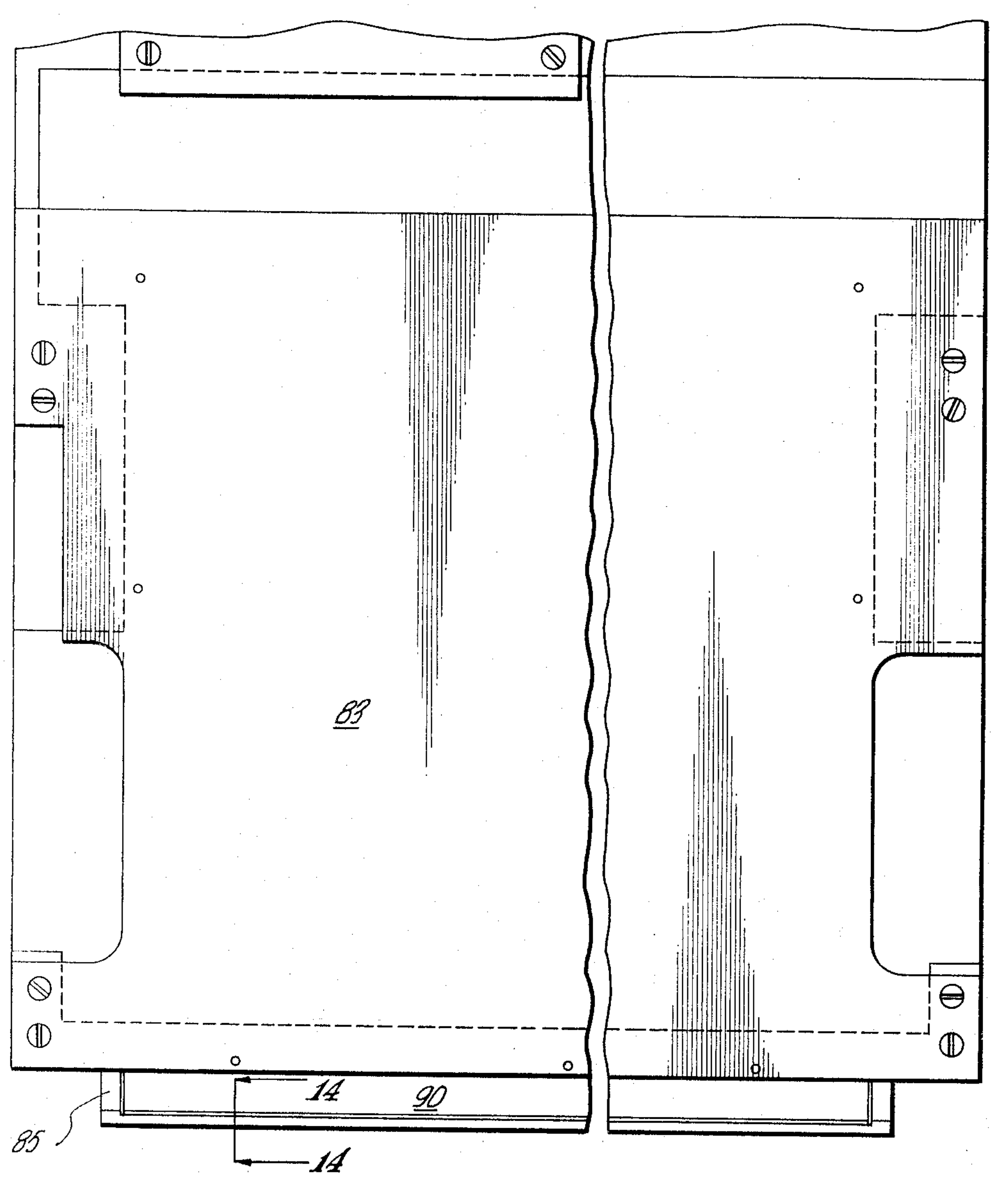
FIG. 8 is a top plan view of the structure of FIG. 7 taken along the line 8—8 of FIG. 4.

The supporting structure 83 mounts the single printed circuit board carrying the row and column buses, as best seen in FIG. 6. The number of column buses 40 preferably correspond to the width of the tray 85 or the total columnar capacity of the tray. As in the aforementioned applications, each of the column buses 40 are provided with a pair of longitudinally extending, insulative guides 41 arranged on opposite sides to the column buses 40. A blank column bus 33 is also provided alongside the column buses 40 and is arranged in a spaced relationship therefrom. The blank column bus 33 is aranged to run transversely of the column buses 40 and is spaced forward thereof, in the direction of the row buses 32, see FIG. 6. The blank column or "no data" indication is further dependent on the row bus 33 arranged forward of the row bars 32 whereby a sensing element 82 cross-connects the buses 33 and 45 in the non-read position and when a blank column is detected. The outgoing lead wires are directly connected to the printed circuit leads 40ᵃ and 32ᵃ either to the distributor circuit or the recording station, as will be made more evident hereinafter.

The sensing elements 82 are maintained in the "no data" position through the inclusion of a magnetic detent in the form of a channel permanent magnet 80. The magnet 80 is carried by the supporting structure 83 forward of the "no data" row bar 45. The channel magnet 80 is a commercially available item and is proportioned to have a magnetic structure to retain each of the sensing elements 82 in their non-read position and to release them when their sensing finger engages a recorded perforation in the record member under the urging of the travel of the record member receiving tray into reading position. A compression spring 88 is carried by the supporting structure 83 and is mounted behind the permanent magnet 80 to cushion the shock of all the sensing elements 82 forcibly returning to the magnet 80 when the tray 85 is fully retracted.

Now referring to FIGS. 9 through 12 in particular, a detailed examination of the modified sensing element 82 will better disclose the additional features of this modified sensing element. It should be noted that the sensing elements 82 are stamped out of the same material as the above-described embodiments and comprise a plurality of flat, thin, elongated, electrical conducting fingers 82ᵃ such as may be constructed from a beryllium copper. Specifically, the use of beryllium copper allows the sensing fingers to have sufficient resiliency to allow the sensing element to engage one of the row conductor bars and column buses while under tension and yet have sufficient stiffness to allow the sensing fingers 82 to be independently slidable when a sensing finger engages a recorded perforation. In this particular embodiment the redundant characteristic of a sensing element is provided through the use of three identical sensing fingers 82ª that are loosely constrained together by means of a saddle 82ᶜ constructed of the same material as the sensing finger proper. Each sensing finger 82ª is defined with a pair of electrical sensing portions arranged adjacent each end and are identified as 82ˣ. Each electrical sensing portion 82ˣ extends outwardly from the body proper of the sensing finger in the same direction while a perforation sensing portion 82ʸ, which is substantially centrally arranged between the electrical sensing portions 82ˣ, extends outwardly from the sensing finger proper in the opposite direction. The perforation sensing portion 82ʸ is generally defined in the same fashion as in the previous embodiments and includes a tapered portion 82ᶻ defined to allow the sensing portion 82ʸ to be readily released from a sensed perforation upon completion of the reading operation.

One of the electrical sensing portions 82ˣ is defined with a socket portion 82ˢ to receive a ball 81ª defined integrally with an armature 81. As will be evident from examining FIG. 10, it will be seen that the armature 81 is arranged with its ball portion 81ª fitted into the socket 82ˢ of the sensing portion 82ˣ and that each of the sensing fingers 82ª are secured together at this sensing portion by means of the saddle 82ᶜ. The saddle 82ᶜ is secured together by means of a dimple portion extending through the socket of the sensing portion 82ˣ as well as a central opening 81ᵇ defined for the armature ball 81ª. It will be recognized that the use of the permanent magnet 80 for securing the sensing element 82 in a non-read position requires that the armature 81 be constructed of a magnetic material. Furthermore, the armature 81 is defined with a magnetic surface to cooperate with the pole faces of the permanent magnet 80 to positively secure the armature 81 thereto and retain each of the sensing elements 82 in this position during the searching operation and to release the sensing element 82 when the sensing portion 82ʸ locates a recorded perforation. The magnetic pull or strength of the magnet 80 is proportioned to allow the force applied to the sensing elements 82 by means of the motion of the tray 85 to overcome the magnetic pull on the armature 81 whereby it is released to travel with the record card receiving tray 85 to provide the correct cossconnection between the column buses 40 and the row conductor bars 32. It will be recognized that the arrangement of the record reader shown in FIG. 5 with the receiving tray 85 open is such that the sensing elements 82 are positioned in the non-read position.

The record member receiving tray 85 includes means for readily inserting and orienting a record member on the tray. Fo this purpose the slidable tray 85 may be considered to comprise a reading station and a record member insertion station. The record member reading station is arranged inwardly of the insertion station whereby the card is slipped over the insertion station onto the reading station. To this end, the reading station is defined in the same general fashion as in the aforementioned applications with the reading station constructed of an insulative material having a plurality of spaced grooves 24 corresponding to the number of rows on the record member or members to be read. The spaced grooves are adapted to receive the perforation sensing portion 82ʸ of the sensing elements 82.

Figure 13:
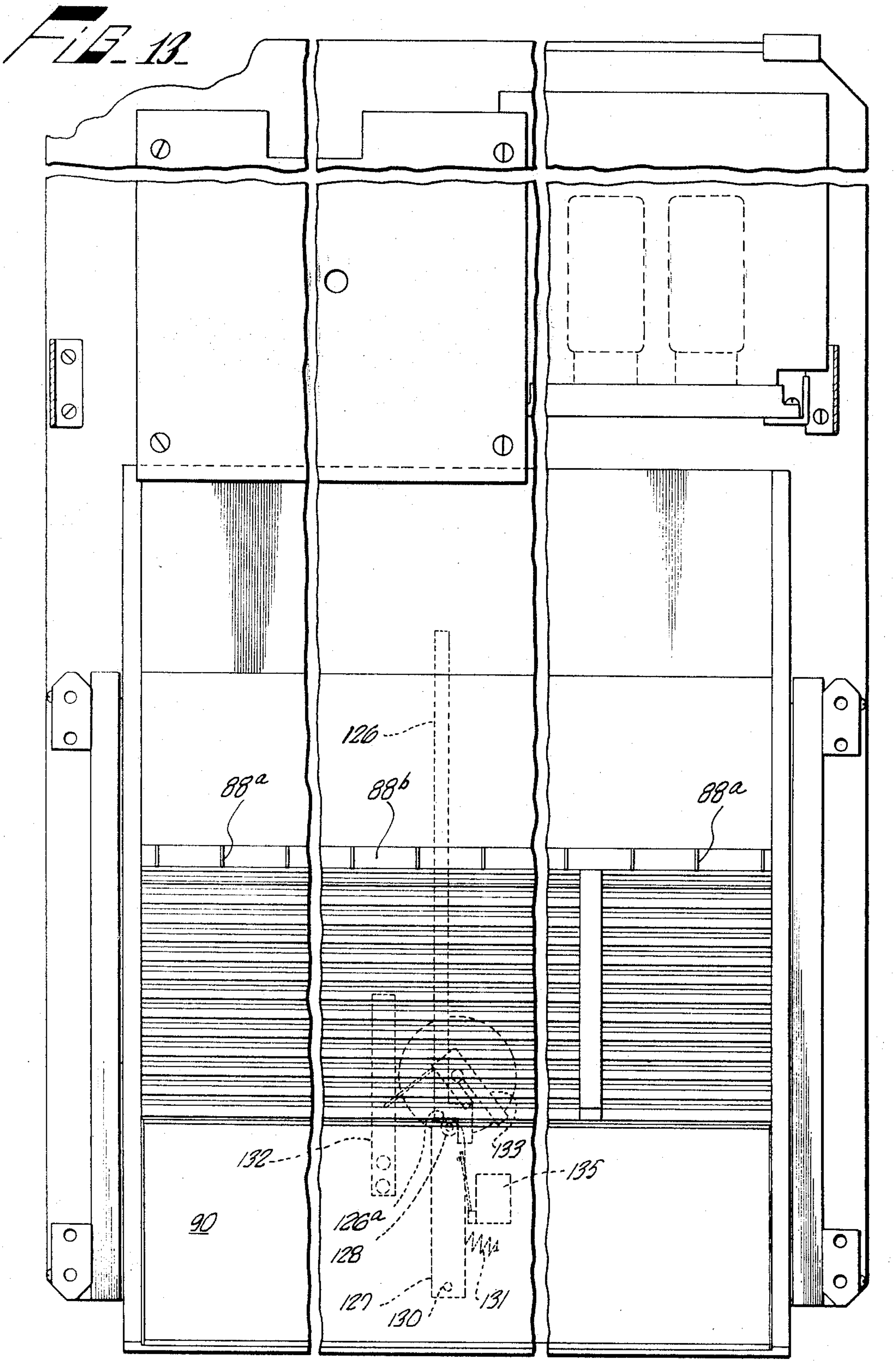
FIG. 13 is a top plan view showing the record card receiving tray taken along the line 13—13 of FIG. 4.
Figure 15:
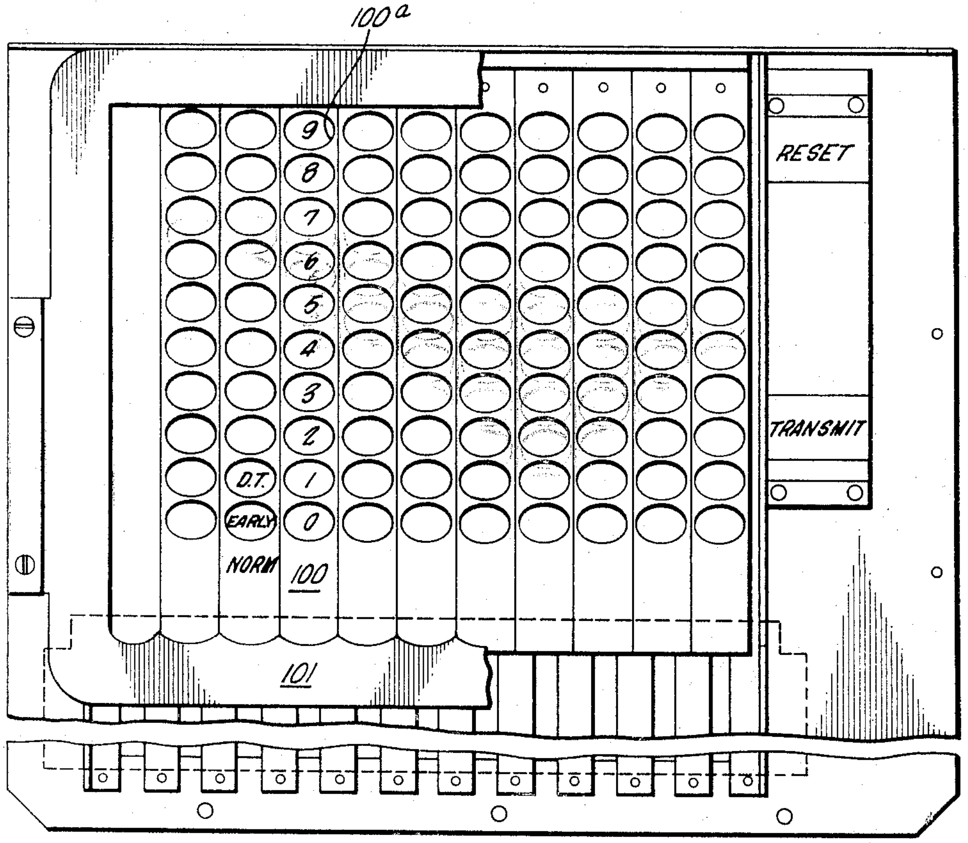
FIG. 15 is a top plan view, with portions broken away, taken along the lines 15—15 of FIG. 3.

The reading station further includes a unique means for positioning a record member just prior to and during the engagement of the perforation sensing portions of the sensing elements whereby even curled and crumpled record members may be read. To this end, adjacent the inner row groove 24 there is defined a low shoulder 88ᵇ extending the entire width of the tray 85 to receive the leading edge of a record member. To prevent the leading edges of a record member from slipping over the shoulder 88ᵇ it is further provided with a plurality of toothlike upward extensions 88ª defined thereon, see FIG. 13. As illustrated, one extension 88ª is utilized for each ten sensing elements. A stationary, flat spacer plate 89 mounted on the supporting structure 83 immediately above the toothlike extensions 88ª and adjacent to the record member contains recessed grooves 89ª which match the extensions 88ª whereby upon movement of the tray 85 the extensions 88ª are guided through the grooves 89ª to thereby completely and positively restrain a record member during its travel into a reading position.

The extensions 88ª are arranged to coincide with each tenth sensing element guide 41 in the sensing element are encountered by the tray 85 as it travels inwardly. In this fashion, then, the perforation sensing portions of the sensing element are not obstructed by this stop. It should also be noted that each tenth guide is aligned with one of the extensions 88ª and, therefore, is defined moore narrowly than the adjacent guides, enabling the narrower guides to avoid the extension 88ª as the tray 85 is pushed in. The combination of the wide and relatively few guides 41 in combination with the extensions 88ª further provides a positive holding means as a record member moves into or out of the reading position.

Figure 4:
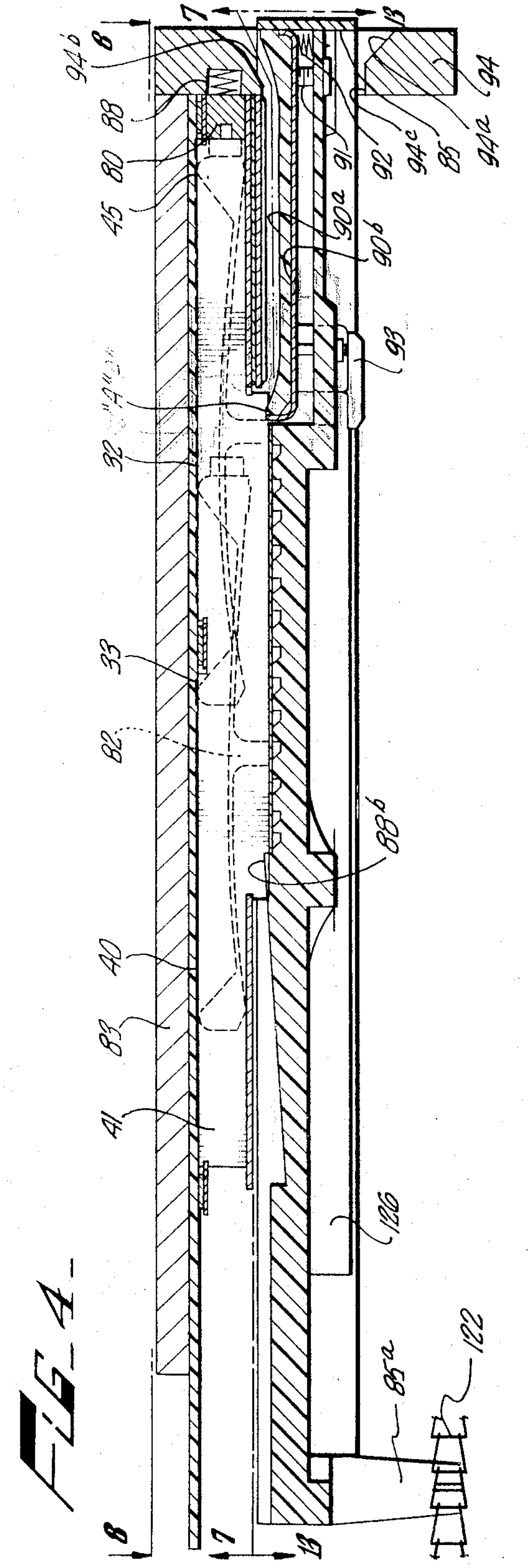
FIG. 4 is a partial longitudinal, cross-sectional view of the record reader portion of the input station showing the record card receiving tray in reading position.
Figure 5:
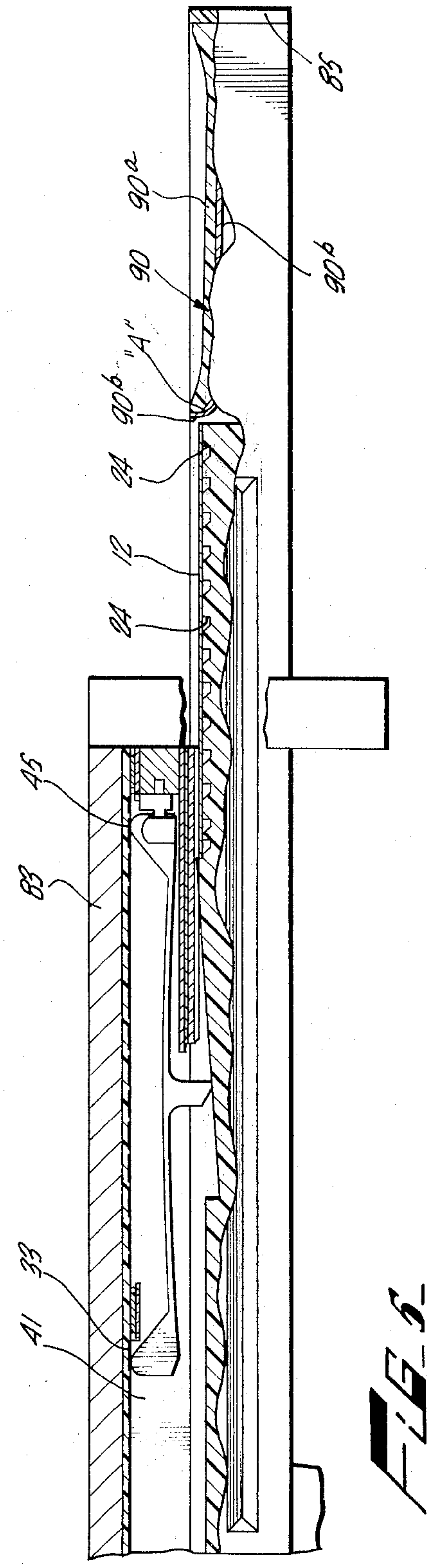
FIG. 5 is a partial elevational, cross-sectional view of the record reader portion of FIG. 4 with the receiving tray shown in its extended, non-read position.
Figure 14:
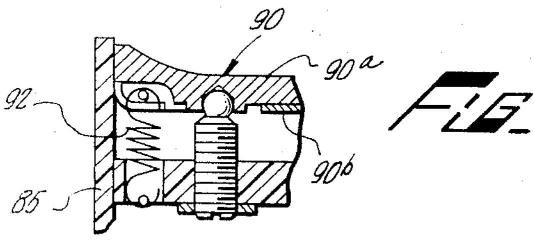
FIG. 14 is a partial cross-sectional view, with portions shown in dotted outline, of the record card receiving tray taken along the line 14—14 of FIG. 8.
Figure 10:
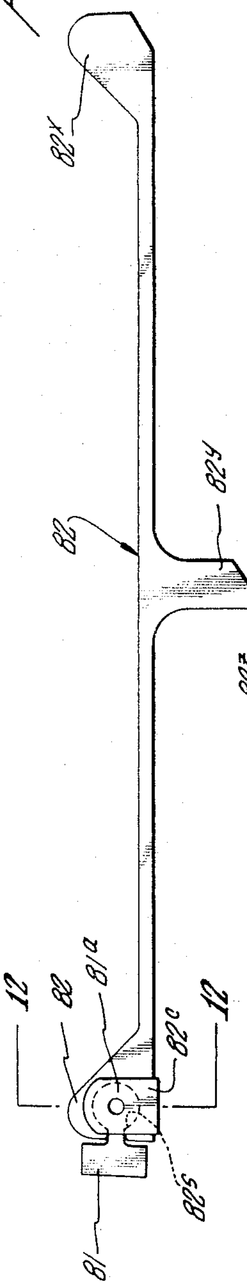
FIG. 10 is a side elevational view of a sensing element for use with the record reader of FIGS. 4 and 5.
Figure 11:
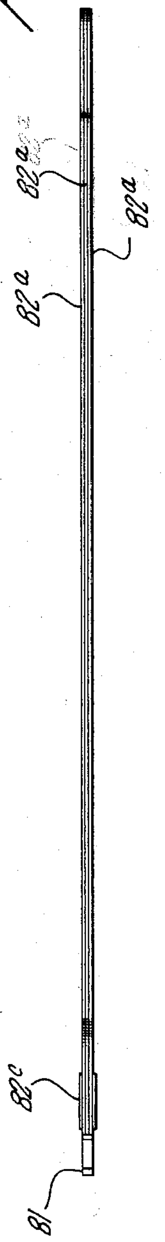
FIG. 11 is a top view of the sensing element of FIG. 10.
Figure 9:
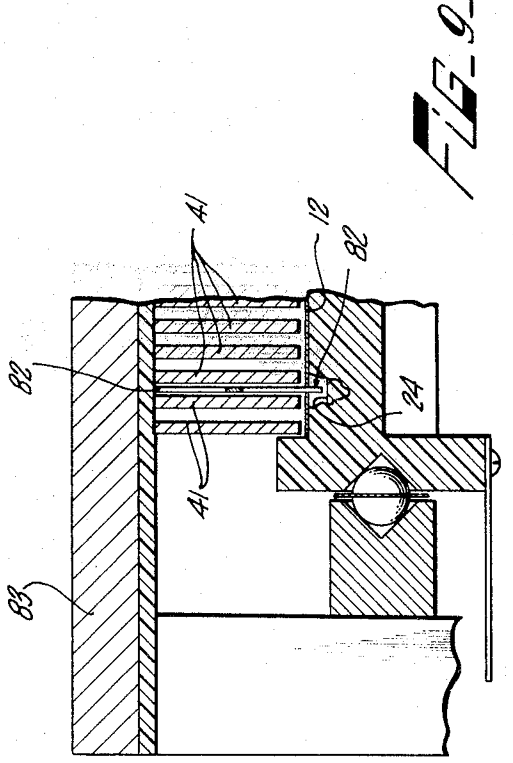
FIG. 9 is a partial cross-sectional view of the supporting structure for the sensing elements for the record reader portion of the input station as shown in FIGS. 4 and 5.
Figure 12:
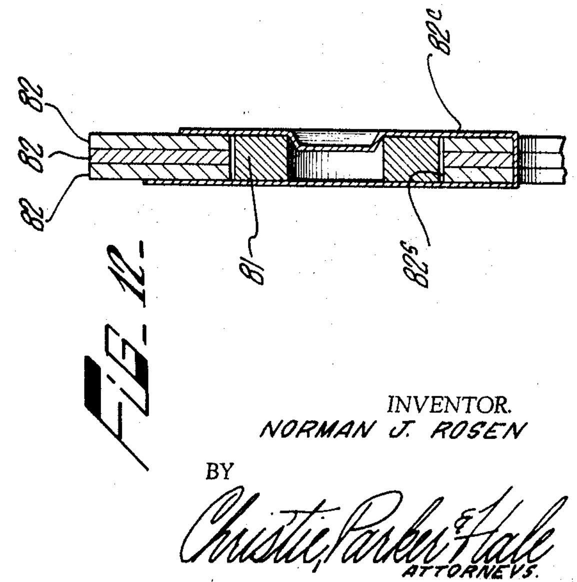
FIG. 12 is a cross-sectional view of the securing means for the sensing element of FIGS. 10 and 11 taken along the line 12—12 of FIG. 10.

Now considering the record member insertion station of the tray 85, it will be seen to comprise an index plate 90 for allowing a record member to be simply and rapidly introduced into the reading station. The plate 90 is conveniently curved to allow easy record member insertion and positive location along its entire width and record member withdrawal through the spring-lifted hinge action provided for the plate 90. The plate 90 is constructed of a plastic material 90ª with a metallic reinforcing element 90ᵇ as a backing member. The index plate 90 is hinged at its outer end to the tray 85 by means of a ball and socket system 91 which further allows universal adjustment, as can be best seen in the detail of FIG. 14. The index plate 90 is urged upwardly by yieldable means shown as the compression spring 92. The compression spring 92 constantly urges the index plate 90 upwardly whereby the inner end thereof extends a preselected amount above the level of the reading station. This extended inner end of the index plate 90 is identified by the reference letter A, and is defined of sufficient height to allow an ample pushing shoulder to be defined by the metallic end 90ᵇ of the index plate 90 for retaining the record member at the reading station when the tray is in its extended or open position, as best seen in FIG. 5. The extension of the end A of index plate 90 above the surface of the reading station is governed by a stop means or shoe 93 positioned underneath the index plate 90 and depending therefrom. The upward travel of the shoe 93 abuts the insulating supporting structure defining the reading station and which structure extends longitudinally below the index plate, as seen from examining FIG. 4.

A further aspect of the record member insertion station includes the construction of the housing for defining a throat through which the movable tray 85 is pushed into and out of reading position. To this end, the throat is defined in the housing by means of a collar 94 having a central opening 94ª extending transversely of the record reader to accommodate the receiving tray 85. The upper surface 94ᵇ of the collar 94 is defined as a camming surface for acting on the upwardly extending tip A of the index plate 90 and push it down to allow it to pass below the spacer 89. The other surface of the collar 94, or lower surface 94ᶜ, is defined as a stop to limit the downward travel of the index plate 90. To this end, the lower surface of the shoe 93 engages the surface 94ᶜ of the collar 94 to limit its downward travel. When the tray 85 is violently closed the shoe 93 impinges upon the surface 94ᶜ just as the tray is pushed into the record reader whereby the index plate 90 temporarily drops below the desired level or below the level of the reading station and is arrested by the coaction of the surface $94^c$ and shoe 93. This feature prevents record members positioned on the tray when it is violently closed from inadvertently slipping over the edge A of the index plate.

With the modified structure for the tray 85 in mind, it will be seen that a record member 12 may be easily inserted into the reading station by the operator depressing the index plate 90 with his thumb and pushing it into the reading station against the shoulder 88. In the same fashion the record member may be simply removed from the reading station after a reading operation is completed.

Figure 1:
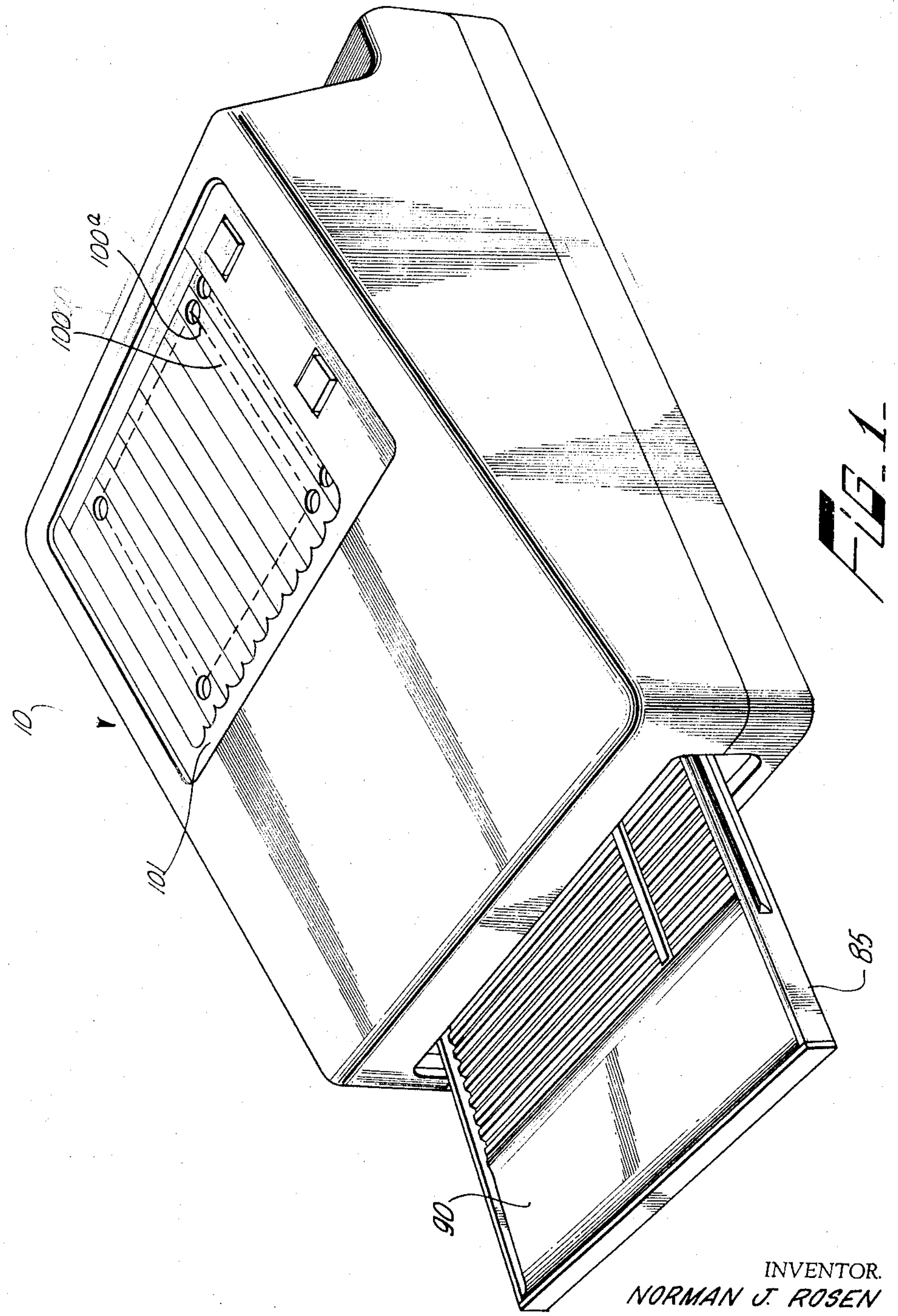
FIG. 1 is a perspective view of the input station in its normal position to accept a record member to be read and embodying the invention.

Now referring to FIGS. 15 through 22 in particular, the parameter switches or means for entering variable data into the input station 10 along with the information derived from the record cards will be examined. The input station 10 is provided with a window on the top side thereof for exposing a plurality of variable data switches, as seen in FIG. 1, in particular. The data switches are arranged in side-by-side relationship and are manually actuated by means of the acrylic slides 100 that are defined with a plurality of digit receiving apertures similar to the aperture $100^a$ to allow the slide 100 to be positioned in a downward direction from that shown in FIGS. 1 and 15 a preselected distance corresponding to the information to be entered into the input station. When the slides 100 represent decimal information, for example, and the operator desires to enter the decimal digit 3 into the input station, he will place one of his fingers in the aperture $100^a$ identified as the decimal digit 3 and pull the slide 100 down until his finger contacts the stop member 101 defined adjacent the bottom portion of the area of slides 100. Information other than decimal information may be coded and/or identified for entry into the input station. It should be noted that various pieces of information may be manually entered into the input station 10 by means of the plurality of slides 100 whereby all of the information exists electrically in a parallel circuit relationship, as will become more evident immediately hereinafter.

Figure 20:
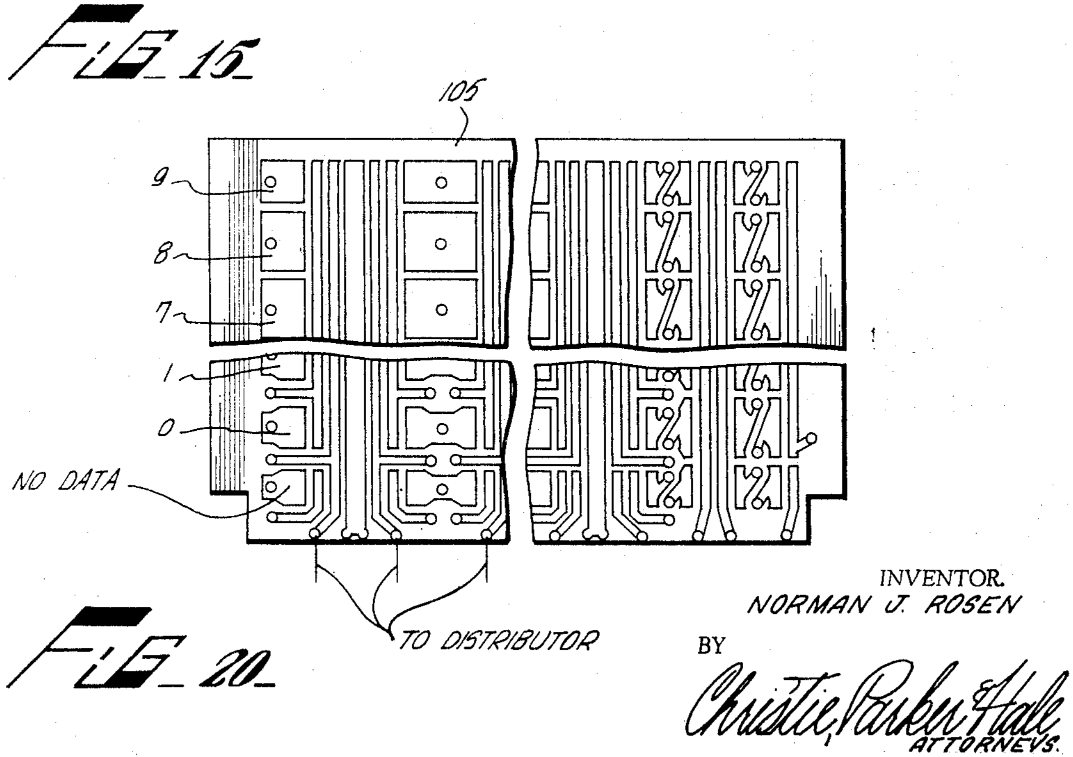
FIG. 20 is a partial plan view of a printed circuit board showing a typical printed circuit pattern for use with the parameter sensing brushes.
Figures 17, 18:
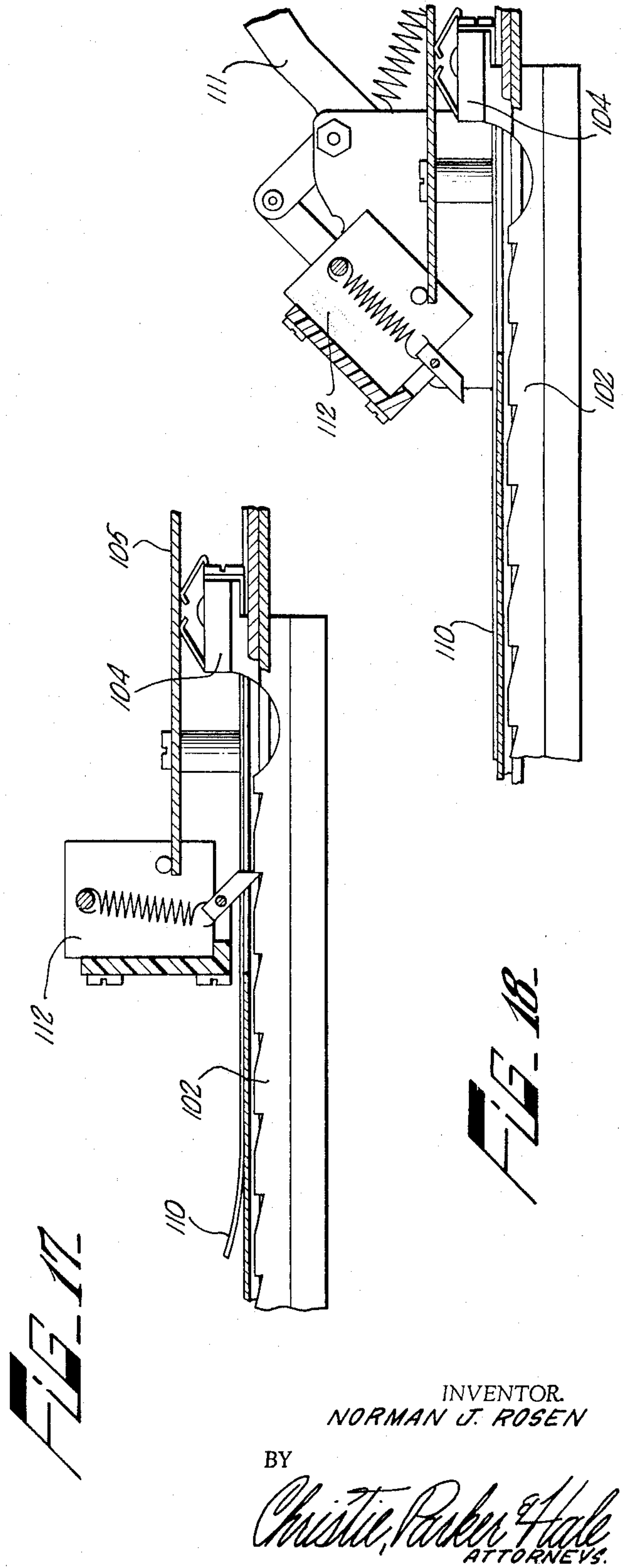
FIG. 17 is a partial cross-sectional view of the parameter brushes in a preselected data position.
FIG. 18 is a partial cross-sectional view of the released position of the slide bar for retraction to the "no data" position.
Figure 19:
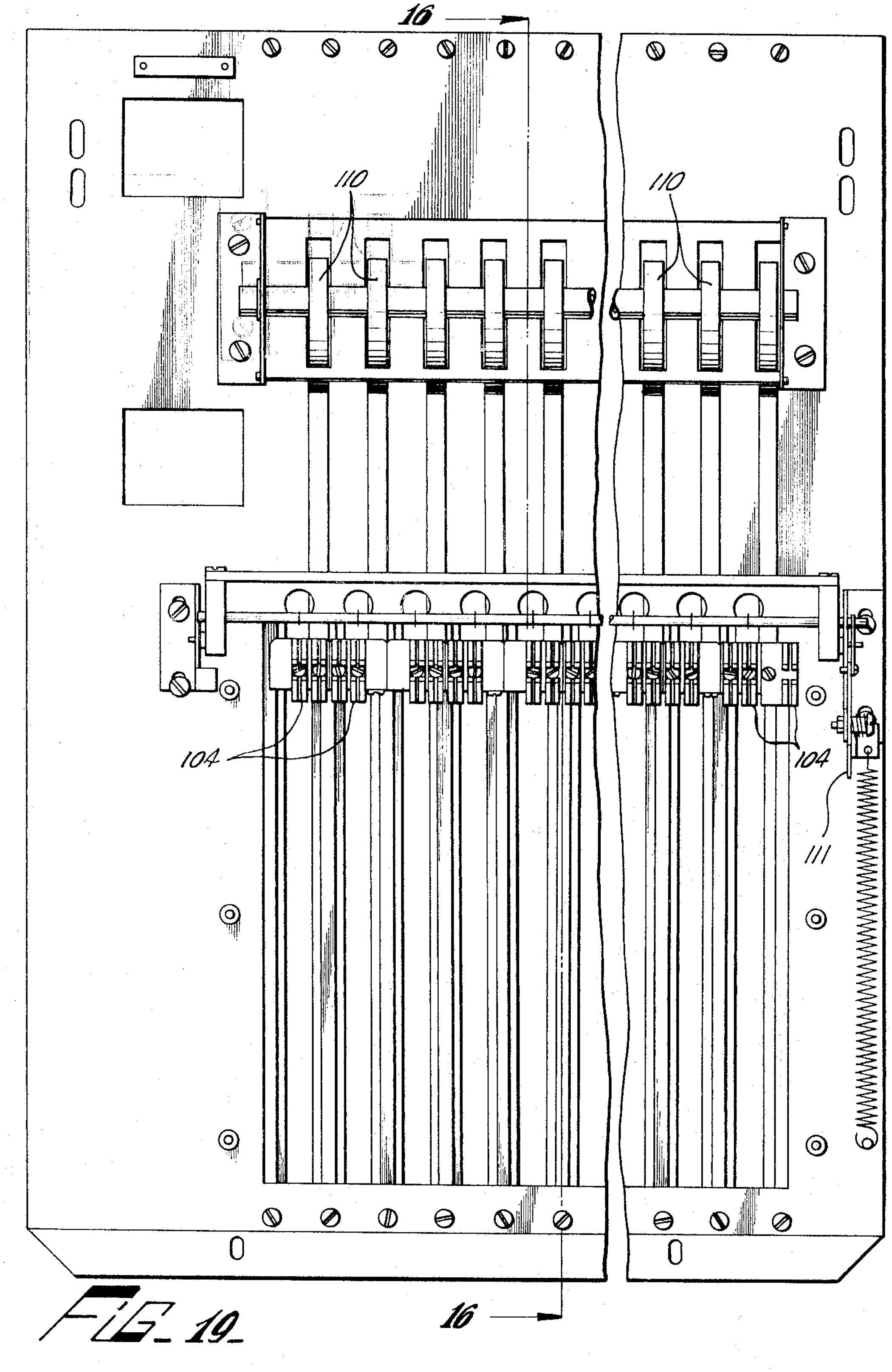
FIG. 19 is a view of the parameter brushes taken along the line 19—19 of FIG. 3.
Figure 21:
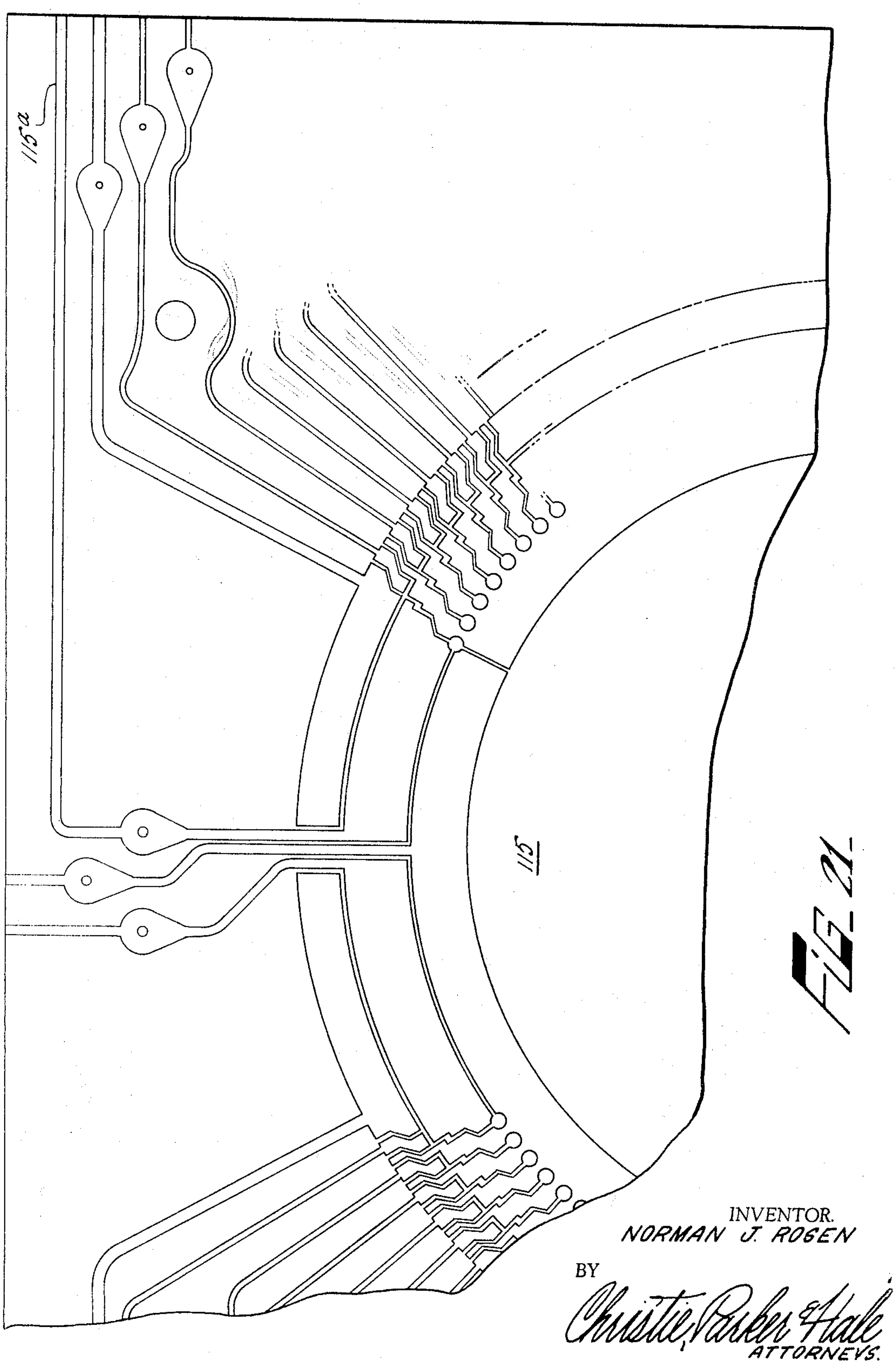
FIG. 21 is a partial top plan view of a typical printed circuit pattern for the distributor of the input station.

Each of the slide bars 100 carry a code bar 102 provided with a series of detents similar to the detent $102^a$ defined for each piece of information identified in a corresponding location on each slide 100. The code bars 102 and their respective detent arrangements $102^a$ coact with a ratchet member 103 mounted in a fixed position on the input station and slidable over the detents of the code bar 102 and adapted to engage one of the detents $102^a$ upon the slide reaching the stop 101, such as best seen in FIG. 17. Each code bar and slide mount at least a single bifurcated sensing element or brush 104 coacting with a printed circuit board 105 to place the brush 104 in a position corresponding to the position that the slide 100 has been moved to for entering a preselected piece of information into the station. A particular pattern for the printed circuit board 105 is illustrated in FIG. 20 and the individual conductive segments that correspond to the decimal data to be entered by means of the slide 100 are identified in FIG. 20. It will be seen that each position of the slide bar 100 has a corresponding unique position on the printed circuit board 105 whereby contact between the conductive portions of the printed circuit on the board 105 and a brush 104 is effective to close a circuit thereto for entering the corresponding information into the input station 10. The opposite side of the printed circuit board 105 from the one illustrated completes the circuit to these segments in a conventional fashion. Each of the slides 100 are arranged in a columnar fashion and, accordingly, have a column bus for identifying the particular slide 100 and are connected to the distributor printed circuit board in a parallel circuit relationship with the column buses 40.

Figure 16:
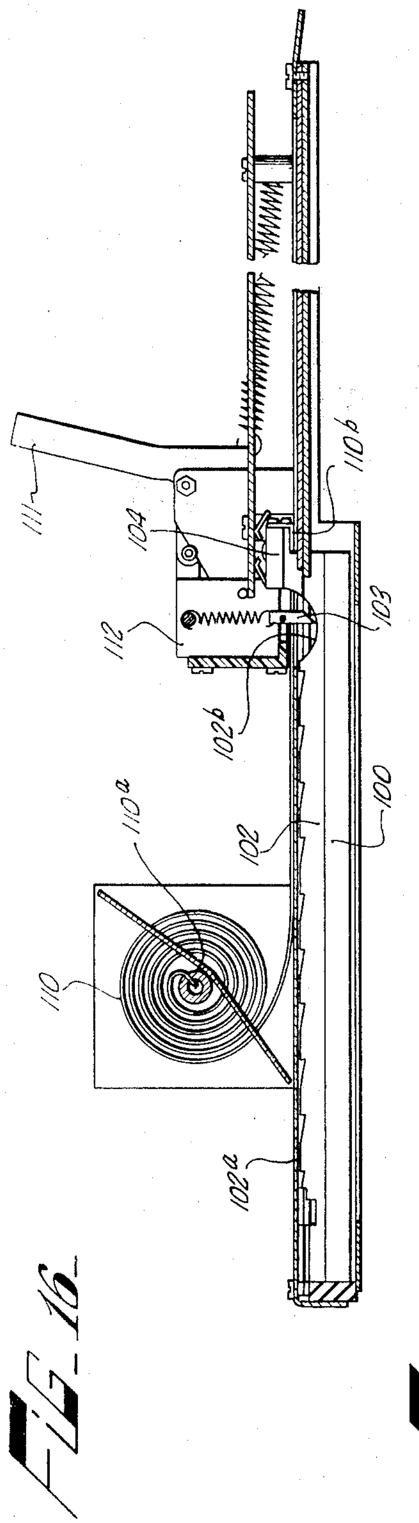
FIG. 16 is a partial cross-sectional view of the parameter brushes shown in the "no data" position.

Each slide is further mounted with a coil spring 110 having one end fixed, such as the end $110^a$ and it opposite end $110^b$ secured by means of a fastener to the brush 104, as best seen in FIG. 16. The coil springs 110 are used to retract the slide 100 to correct an erroneous entry into the input station 10 or to erase the previously entered information to prepare the station for the entry of new information. To this end, the slides 100 may be released by sliding them to their most downward position, as shown in FIG. 16, to place the ratchet member 103 within the cut-out portion $102^b$ of the code bar 102. The slide bars 100 may then be retracted under the energy stored in the individual coil spring 110 through the actuation of the slide release bar 111 mounted to each of the mounting blocks 112 mounting the detent element 103 and its associated springs 113 to pivot the detent element 103 out of the path of the code bars 102, as best seen in FIG. 18, and allow the code bar 102 and slide 100 along with the brush 104 to return to their "no data" position.

With the above structure in mind, the connections of the column buses 40 and the corresponding column buses for the data switches to the distributor circuit board 115 will be examined in more detail. A fragmentary portion of the distributor printed circuit board is shown in detail in FIG. 21, and which printed circuit board may have 100 distributor terminals for example whereby 100 pieces of information may be sequentially distributed thereby. Each of the column buses 40 and their corresponding lead wires $40^a$ (see FIG. 6) are coupled to an individual input lead wire similar to the lead wire $115^a$ for the distributor circuit for actuation in a preselected sequence. Accordingly, each of the column signals from either the column buses $40^a$ or the selector switch circuits are individually connected to a particular lead wire $115^a$ defined on the distributor circuit 115 and arranged in any desired fashion to suit the needs at the recording station and/or the data processing system.

Figure 3:
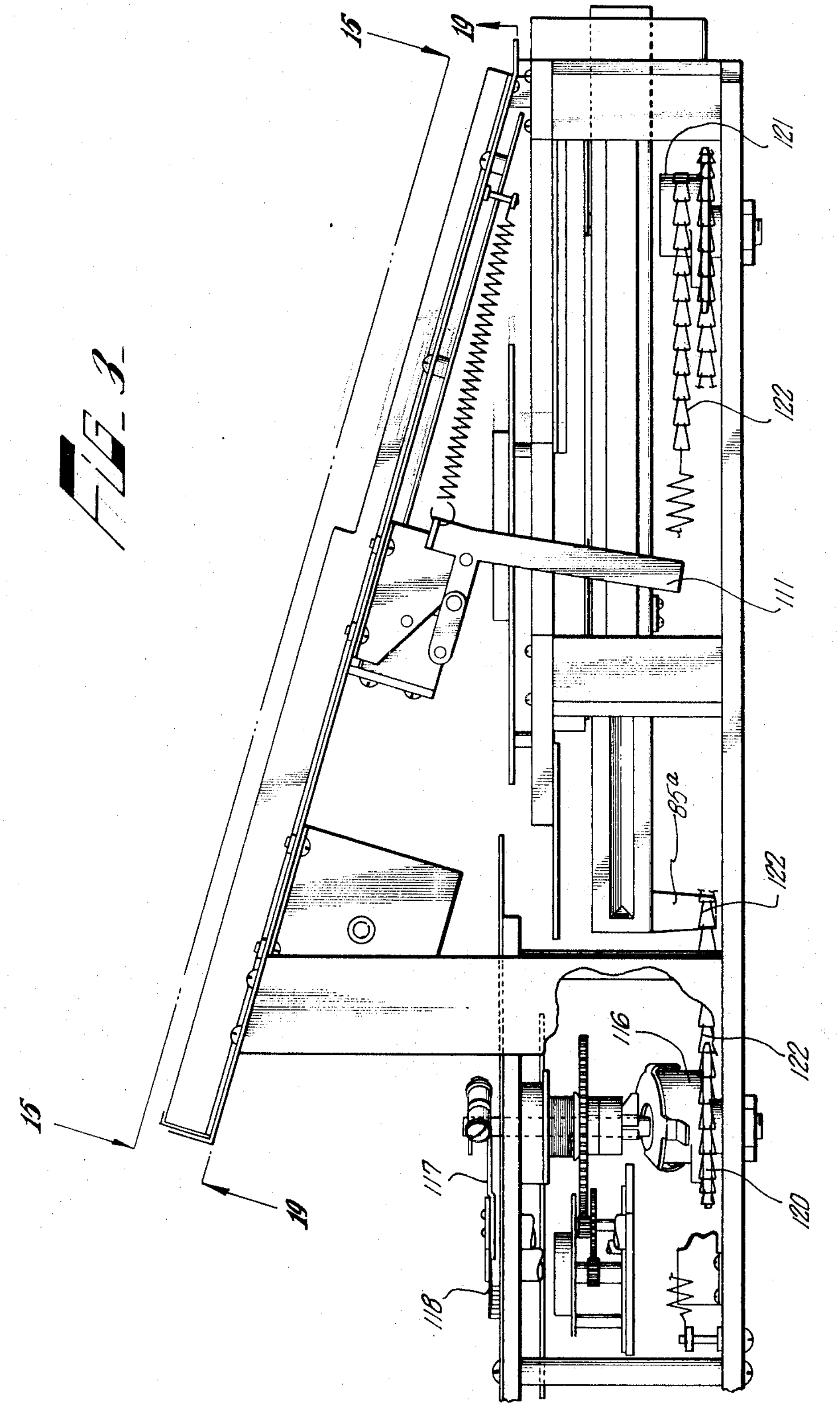
FIG. 3 is a side elevational view of the input station of FIG. 1 with the housing removed.
Figure 22:
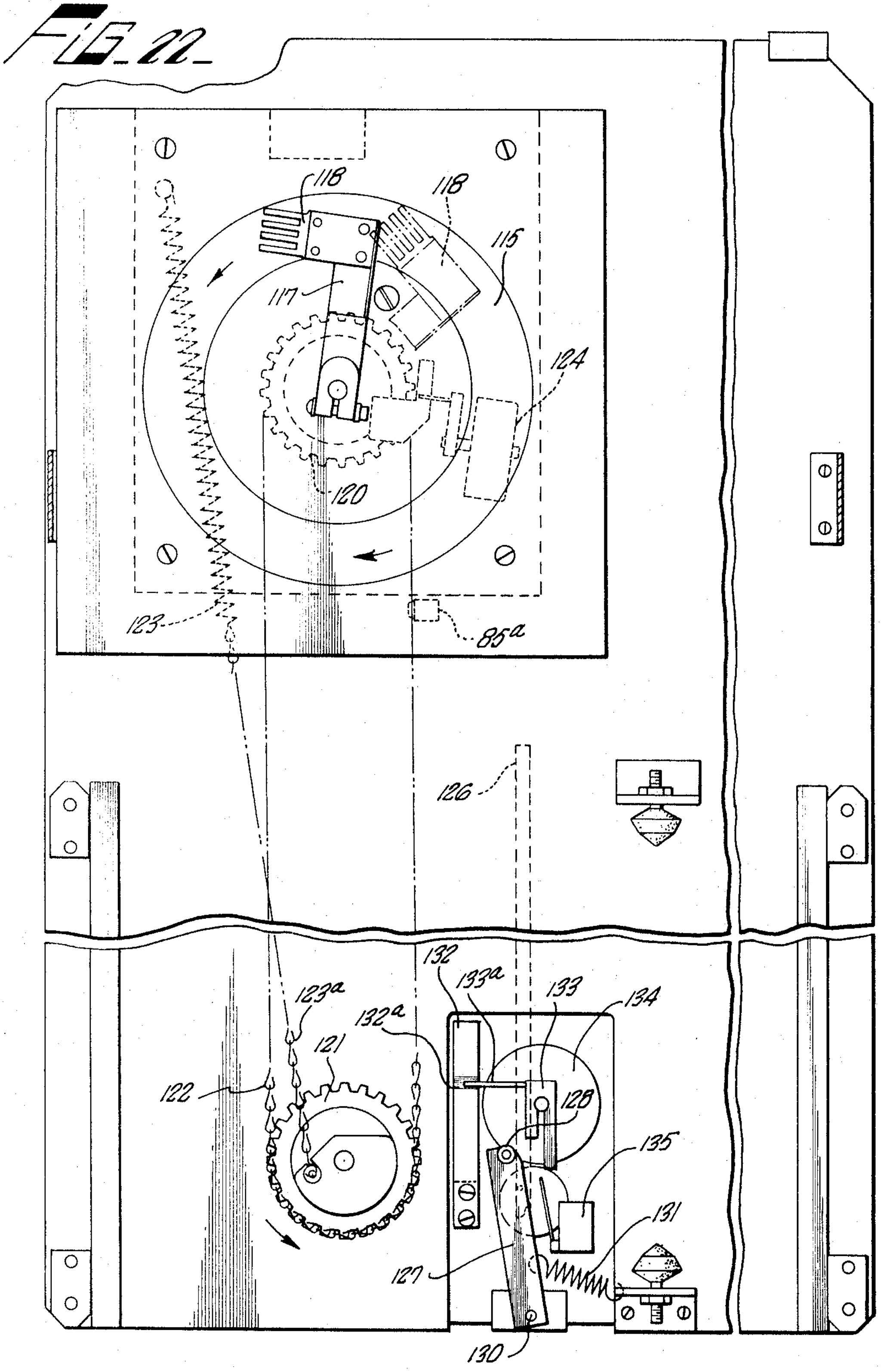
FIG. 22 is a top plan view of the base with the tray removed showing the tray locking mechanism and the arrangement of the distributor.

The printed circuit board 115 is a portion of the distributing means which includes a distributor motor 116 mounting a distributor arm 117 and, in turn, mounting a brush 118 for sliding engagement with a printed circuit pattern of the distributor printed circuit 115; see FIGS. 3 and 22. The distributor motor 116 is preferably constructed of a conventional and commercially available dial telephone spring motor in view of its excellent torque speed characteristic which allows the information to be distributed at a substantially constant rate. Stated differently, the spring motor 116 rotates the distributor arm 117 at a uniform rate with a high degree of reliability.

The spring motor 116 is adapted to be wound in response to the insertion of the card receiving tray 85 into reading position in the input station 10. To this end, a timing gear 120 is mounted to the spring motor 116 and coacts with a cam gear 121. This is accomplished by means of a chain 122 wound around the timing gear 120 and the cam gear 121 and coupled to the tray 85 at the depending post $85^a$, as shown in FIGS. 3 and 4. A tension spring 123 has one end secured to the base and the other end secured to the cam gear 121 by means of a chain $123^a$, as best seen in FIG. 22. The spindle for the cam gear 121 is defined with an eccentric diameter in the area where it passes through the base plate for extending the spring 123. The position of the cam gear 121 shown in FIG. 22 is the position assumed when the tray 85 is extended completely out. When the tray is in the card reading position, fully within the input station 10, the cam gear 121 has revolved approximately 300 degrees counterclockwise from the illustrated position and the spring 123 is then extended to its maximum extent.

The inward travel of the tray 85, then, winds the spring motor and the energy stored in the motor is effective to rotate the distributor arm 117 whereby the brush 118 passes over the printed circuit pattern of the distribution board 115. The distributor motor 116 is normally maintained in an inoperative position through the provision of the distributor release solenoid 124 which engages the motor spindle in a locking position and is disengageable therefrom by means of a command signal, preferably a command signal to release the motor is derived from the recording station after it has been determined that no errors have been made in entering the data into the input station 10 and the data is prepared to be received at the recording station.

It will be evident that in order to properly distribute the information some means must be provided for locking the tray 85 into the reading position and maintaining it in this position during the interval that the distributor motor 116 is rotating. To this end, the tray is provided with a shoulder 126 defined at the bottom thereof for coaction with an arm 127 mounting a roller 128. The arm 127 is pivotally mounted at a point 130 at one end, while it mounts the roller 128 at the opposite end. The arrangement is such that the roller 128 rolls along the shoulder 126 with the movement of the tray. The shoulder 126 is further defined with a locking corner 126$^a$ to receive and lock the arm 127 as the roller 128 rolls into the corner as the tray is inserted into the input station 10 proper, see FIG. 13. The arm 127 is urged into the corner 126$^a$ through the provision of a compression spring 131 mounted thereto and to the base structure. The latching action of the arm 127 is further enhanced through the provision of a memory spring 132 mounted adjacent thereto and for coaction with the locking element 133 having an arm 133$^a$ for engaging the locking portion 132$^a$ of the memory spring to aid in maintaining the arm 127 in the corner 126$^a$ and thereby the tray 85 locked for data distribution purposes. The locking element 133 is mounted to be actuated by a rotary solenoid 134. It should also be noted that the locked position of the arm 127 is effective to actuate a microswitch 135 positioned adjacent thereto. The actuation of the microswitch 135 signals that the station is ready to transmit information to the recording station. Accordingly, upon the receipt of the command signal to the distributor release solenoid 124 the information is transmitted thereto. Upon completion of the distribution of the data, a signal is applied to the rotary solenoid 134 to release the locking element 133 and thereby allow the arm 127 to rotate counter-clockwise out of the corner 128 and release the tray 85. The tray 85 then is ejected from the input station proper as a result of the stored energy in the spring 123.

What is claimed is:

1. An input station for a data processing system, said station comprising a base member, a housing connected to the base member, a record card receiving tray mounted for sliding movement relative to the base member and adapted to be slidably extended from the housing at least a distance to allow a record card to be positioned on the exposed portion of the tray and to be slidably extended into the housing to allow a record card positioned on the tray to be read, means for latching the tray in a reading position, means for reading all of the perforations in a record card substantially simultaneously and electrically indicating the row and column of the perforations on the record member, spring motor means, means responsive to the movement of the tray into reading position for winding the spring motor means, means operable for latching and releasing said spring motor means, distributor means coupled to said motor means for actuation therefrom, individual circuit means coupling each of said row and column signals to said distributor means whereby the signals may be distributed in a preselected sequence upon the release of said motor means.

2. An input station for a data processing system, said station comprising a base member, a housing connected to the base member, a record card receiving tray mounted for sliding movement relative to the base member and adapted to be slidably extended from the housing at least a distance to allow a record card to be positioned on the exposed portion of the tray and to be slidably extended into the housing to allow a record card positioned on the tray to be read, means for latching the tray in a reading position, means for reading all of the perforations in a record card substantially simultaneously and electrically indicating the row and column of the perforations on the record member, means for connecting data signals to said distributor means in parallel circuit relationship with said row and column signals, spring motor means, means responsive to the movement of the tray into reading position for winding the spring motor means, means operable for latching and releasing said spring motor means, distributor means coupled to said motor means for actuation therefrom, individual circuit means coupling each of said row and column signals to said distributor means whereby the signals are distributed in a preselected sequence upon the release of said motor means.

3. An input station for a data collection system, the station being coupled to a recorder for storing the electrical signals transmitted thereto from a plurality of input stations, each of said stations comprising a base member, a dial telephone spring motor mounted on the base member, a distributor disc having a plurality of distributing terminals, a conductive distributor arm mounted for rotation by said motor to sequentially contact the distributing terminals, releasable means for maintaining said motor in a non-distributing position and to release the motor upon command, a tray for receiving a perforated record card to be read slidably mounted on said base member from a reading position to a non-reading card receiving position, means coupled between said tray and said motor responsive to the movement of the tray into the reading position for winding the spring motor, a plurality of electrical conductive perforation sensing means connected to an individual distributor terminal and providing an electrical signal identifying the physical location of a sensed perforation on the record card, the distributor arm sequentially contacting the distributor terminals upon actuation of said releasable means whereby the perforation location signals are transmitted to the recorder through the individual sensing means.

4. An input station for a data collection system, the station being coupled to a recorder for storing the electrical signals transmitted thereto from a plurality of input stations, said station comprising a base member, a dial telephone type spring motor mounted on the base member, a distributor disc having a plurality of distributing terminals, a conductive distributor arm mounted for rotation by said motor to sequentially contact the distributing terminals, releasable means for maintaining said motor in a non-distributing position and to release the motor upon receiving a command signal, a tray for receiving a perforated record card to be read slidably mounted on said base member from a reading position to a non-reading card receiving position, means coupled between said tray and said motor responsive to the movement of the tray into the reading position for winding the spring motor, a plurality of electrical conductive sensing means connected to an individual distributor terminal and providing an electrical signal identifying the physical location of a sensed perforation on the record card, a plurality of manually operated switch means mounted on the base member for entering additional information at the input station, circuit means connecting each of said switch means with an individual distributing terminal, the distributor arm sequentially contacting the distributor terminals upon actuation of said releasable means whereby the perforation location signals and said switch signals are transmitted to the recorder.

5. An input station for a data collection system as defined in claim 4 including releasable means for locking the card receiving tray in a reading position.

No references cited.

MAYNARD R. WILBUR, *Primary Examiner.*

L. I. SCHNEIDER, *Assistant Examiner.*